March 1, 1955 A. G. PERKINS 2,703,100
COLLAPSIBLE VALVE FOR MILKING MACHINES
Original Filed Oct. 30, 1948
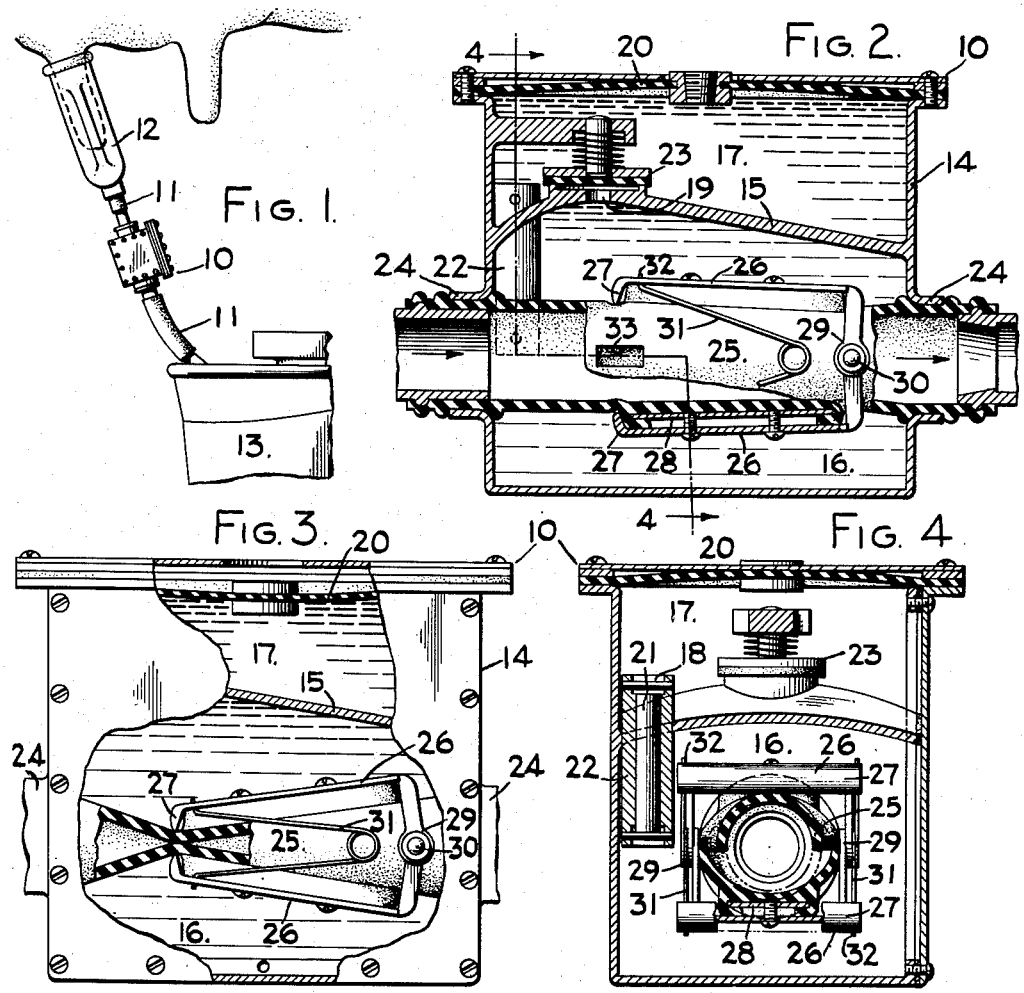
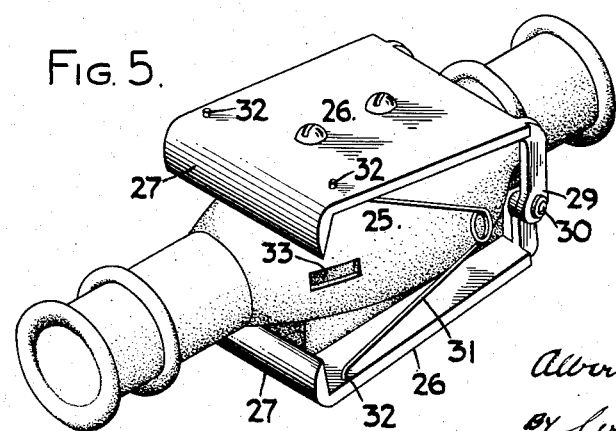
Fig. 5.
INVENTOR
Albert G. Perkins
by Walker P. Guyer
ATTORNEY

United States Patent Office 2,703,100
Patented Mar. 1, 1955

2,703,100

COLLAPSIBLE VALVE FOR MILKING MACHINES

Albert G. Perkins, Grand Island, N. Y.

Original application October 30, 1948, Serial No. 57,609, now Patent No. 2,558,152, dated June 26, 1951. Divided and this application February 6, 1951, Serial No. 209,636

8 Claims. (Cl. 137—455)

This invention relates to certain new and useful improvements in valves, but more particularly to a valve for use in fluid pressure lines such, for example, as the milk flow lines of automatic milking machines, and is a division of my application Serial No. 57,609, filed October 30, 1948, now Patent No. 2,558,152.

It has for its primary object to provide a valve of this character which is simple and efficient in operation, and which effectually responds to automatically close or open the fluid line as determined by pressure conditions.

Another object of the invention is to provide a fluid control valve for milking machines and the like which embodies a flexible, contractible tube-like valve member having contractible elements applied thereto for causing the collapse of the valve member across a transverse line to a closed position and adapted for movement therewith to an expanded open position.

Other features of the invention reside in the construction and arrangement of parts hereinafter described and particularly pointed out in the appended claims.

In the accompanying drawings:

Figure 1 is a fragmentary side view of a milking machine showing a control unit connected thereto and embodying my valve. Figure 2 is an enlarged longitudinal section of the control unit showing the valve in its open position. Figure 3 is a fragmentary sectional view of the control unit showing the valve in its closed or contracted position. Figure 4 is a cross section taken substantially in the plane of line 4—4, Figure 2. Figure 5 is a detached perspective view of one of the tube sections or valve members constituting my invention.

Similar characters of reference indicate corresponding parts throughout the several views.

By way of example, I have shown my improved valve in connection with a control unit for milking machines, disclosed in my aforesaid application Serial No. 57,609, such unit being designed to automatically cut off the vacuum in the milk flow connection to the teat cup when the surge of milk from the companion quarter of the cow's bag substantially ceases, to thereupon cause that cup to be released and drop by gravity from the cow and effectually prevent injury to the cow from overmilking. This control unit is indicated generally by the numeral 10 and is interposed in the flexible milk tube or hose connection 11 which has a teat cup 12 at one end and is connected at its other end to the milk-receiving can 13 of the milking machine.

The control unit consists of a body or casing 14 having a partition 15 therein dividing it into a lower chamber 16 and an upper chamber or reservoir 17 each adapted to be filled with a fluid and in fluid communication with each other through a vent port 18 and a check valve controlled port 19 for automatically governing the interflow of fluid in accordance with a change in the vacuum which takes place during the milking operation. One of the walls of the chamber 17 has a displaceable diaphragm 20 which contracts or expands during the interflow of fluid from one chamber to the other. The vent port 18 constitutes a by-pass between the chambers 16, 17 and is in the form of a plunger 21 freely movable to a limited extent in an open ended cylinder 22 formed in the casing, the clearance between the plunger and cylinder being such as to provide a by-pass of substantially capillary dimensions for the flow of fluid between the chambers. The port 19 is normally closed by a check valve 23 including a spring for urging it downwardly to a closed position.

At its opposite ends and substantially centrally of its lower chamber 16, the casing 14 has alined nipples or tubular supports 24 thereon supporting the intake and discharge ends of a flexible, contractible, tube-like conduit section or valve member 25 of rubber or like material extending from end to end of such lower chamber in fluid-sealed relation thereto and in interposed milk flow communication with the teat connection 11. The central or intermediate portion of the valve member suspended within this chamber and which is adapted to be contracted or collapsed from the open position shown in Figure 2 to the closed position shown in Figure 3, is somewhat laterally enlarged or widened into elliptical-like cross section with substantially flat top and bottom surfaces to more readily respond to a collapsing of the valve member to a shut off position by the vacuum in the system when the companion bag-quarter is substantially milked out. This valve member has flanged attaching collars at its ends which snugly fit the bores of the casing-nipples 24 and detachably retain such member against axial displacement. Applied to the diametrically opposite or top and bottom faces of the valve member to move therewith toward and from each other to cause its contraction along a transverse plane or line to a closed position are flat plates 26, 26 having oppositely-facing jaws or elements 27 at one end for biting into and contracting the valve member to a closed or sealed position. These jaw-plates may be suitably fastened to attaching plates 28 embedded in the top and bottom walls of the valve member. For the purpose of uniformly guiding the jaw-plates in their contracting and expanding movements I provide their other ends with opposing laterally-spaced hinge ears 29 joined by transverse pintles 30 at opposite sides of the valve member and in the axial plane thereof. While the elasticity of the rubber valve member would normally urge the jaw-plates to their expanded position shown in Figure 2, I preferably employ coil springs 31 between such plates along the opposite sides of the valve member with the legs 32 thereof detachably fitted in corresponding openings in the plates. To insure the closing of the valve member at its resulting crimped or folded ends, when the jaw plates are contracted, such ends are recessed, as indicated at 33, to reduce the thickness of the valve-walls at those points. Vent passages (not shown) are provided in the teat connection at either side of the valve control unit to properly vent the same to the atmosphere after the companion quarter of the cow's bag has been milked out and the tube section contracted to its closed position to permit the corresponding teat cup to drop from the cow and the displaced or contracted parts of the control unit to return to their initial or normal position.

During the contraction of the valve member 25 to shut off the vacuum to the teat cup, the flow of fluid from the upper to the lower chamber of the control unit through the capillary, plunger-valve-controlled port 18 is comparatively slow to afford a gradual contraction of the valve member with the jaw-plates 26 contracting therewith to effectually and uniformly seal it closed when the flow of milk from the cow substantially ceases. The teat cup thereupon drops from the cow and the contracted valve member and its jaw plates subsequently return to their initial position and the displaced fluid is returned from the lower chamber 16 to the upper chamber 17 through the check valve controlled port 19.

In operation, each control unit operates independently to shut off the vacuum to its teat cup when the companion quarter of the cow's bag is milked out, the vacuum at that time being substantially constant in the unit and causing the latter to assume the position shown in Figure 3, with the valve member 25 drawn together and sealed to a shut off position by the plates 26. During this contraction or collapse of the valve member due to the constantly maintained pressure differential in and about the valve member, that is, the vacuum therein and the atmospheric pressure in the upper chamber 17 and subsequently in the lower chamber 16, there is a resulting displacement of the fluid from the reservoir 17 to the chamber 16 through the vent port 18 and the jaw plates 26 contract with the valve member to effectually seal it. The hinging of the jaw plates to each other provides for the controlled collapse of the valve member 25 and concentrates such collapse along a transverse line or plane, and these plates also function to maintain the outlet or suction end of the valve member distended so that the pressure differential is maintained over the area thereof embraced by the jaw plates. After sealing of the valve member in this manner, the provision of the vent passages in the teat connection at either side of the control unit allows atmosphere to be admitted thereto to cause the companion teat cup to drop from the cow and the displaced or contracted parts of the control unit to return to their initial position shown in Figure 2 and the displaced fluid to return from the chamber 16 to the reservoir 17 through the port 19. During the normal milking operation with milk surging through the unit, the valve member and its jaw plates partially collapse or fluctuate somewhat in response to the operating cycle of the milking machine, but such displacement is not sufficient, because of the time element transpiring during such periods, to effect the complete and sealed collapse of the valve member.

I claim as my invention:

1. A vacuum collapsible valve member for interposition in the milk flow tube of a milking machine, comprising a tubular section of flexible material and of a cross section to assume a flattened closed position transversely thereof when collapsed, and rigid, hingedly-connected plates directly borne by and secured to the diametrically-opposite sides of said tube section and constituting jaws contractible with such section, and a spring in operative relation to said plates for normally urging the latter and the tube section to a distended open position.

2. A valve for use in the milk flow tube of a milking machine, comprising a tube-like member having inlet and outlet attaching portions at its ends adapted to be interposed in vacuum and milk flow relation to the milk tube and a flexible intermediate portion with substantially flat top and bottom walls having means attached thereto for normally yieldingly resisting its collapse but adapted for collapse with such portion by vacuum into transverse contacting relation to a vacuum and milk shut off position in response to a pressure differential in and about the tube member when the flow of milk therethrough substantially ceases, said means consisting of rigid, hingedly-connected plates attached to the flat top and bottom walls of said intermediate portion of the tube member and having a spring interposed therebetween normally yieldingly retaining such portion in its distended position.

3. A valve for use in the milk flow tube of a milking machine, comprising a tube-like member having attaching collars at its ends and an intermediate widened portion adapted for collapse by vacuum to a milk shut off position and having substantially flat exterior top and bottom surfaces, plates attached to the top and bottom surfaces of the widened portion of said tube-like member and hinged at one end to each other and having oppositely-facing elements at their other ends for engagement in a transverse plane with such surfaces, and a spring disposed between said plates normally urging them to a distended valve-opened position.

4. A vacuum collapsible normally open valve member, comprising a tubular section of flexible material and of a cross section capable of assuming a flattened closed position transversely thereof when collapsed, and relatively rigid plate means extending longitudinally of said section and secured to the diametrically-opposite sides of said tube section intermediately of the ends of the plate means and being hingedly interconnected at one end to constitute jaws contractible with such section for collapsing the section adjacent the other end of said plate means, said valve member comprising resilient biasing means urging the valve toward its normally open position.

5. A vacuum collapsible normally open valve member for interposition in the milk flow tube of a milking machine, comprising a tubular section of flexible material having a flow inlet end and a flow outlet end, said section having a cross section capable of assuming a flattened closed position transversely thereof when collapsed, and relatively rigid plate means extending longitudinally of said section, said plate means being secured to the diametrically-opposite sides of said tube section intermediately of the ends of the plate means and being hingedly interconnected at the end of the plate means nearest said outlet end to constitute jaws contractible with such section for collapsing the section at the end of said plate means nearest said inlet end under the influence of vacuum applied to the interior of said section from said outlet end, said valve member comprising resilient biasing means urging the valve toward its normally open position.

6. A vacuum collapsible normally open valve member for inter-position in the milk flow tube of a milking machine, comprising a tubular section of flexible material having flow inlet and outlet ends, said section being of a cross section capable of assuming a flattened closed position transversely thereof when collapsed, and jaw arm members disposed in flanking relation to said section and extending longitudinally of said section from said outlet end to a plane transverse to the section and near said inlet end, said arm members being hingedly interconnected at their ends adjacent said outlet end and having opposing inwardly-directed jaw elements at their other ends for engaging said tubular section to clamp the same at the jaw elements in said plane when the arm members are contracted, said arm members being secured to diametrically-opposite sides of said tube section intermediate of the hinged and jaw element ends of the arm members to be operatively contracted by and upon contraction of said tubular section, said valve member comprising resilient biasing means urging the valve toward its normally open position but permitting collapsing closure thereof at said transverse plane by suction applied within said section from said outlet end and the force resulting therefrom as applied through said arm members to the jaw elements.

7. A vacuum collapsible normally open valve member for inter-position in the milk flow tube of a milking machine, comprising a tubular section of flexible material having flow inlet and outlet ends, said section being of a cross section capable of assuming a flattened closed position transversely thereof when collapsed, and a detachable clamp structure embracing said section, said clamp structure comprising jaw arm members extending longitudinally of said section in flanking relation thereto, said arm members being hingedly interconnected at their ends nearest said outlet end and having opposing inwardly-directed jaw elements at their other ends for engaging said tubular section to clamp the same in a transverse plane at said jaw elements when contracted, said arm members being detachably secured to diametrically-opposite sides of said tube section intermediate of the hinged and jaw element ends of the arm members to be operatively contracted by such section upon contraction of the latter, said valve member comprising resilient biasing means urging the valve toward its normally open position but permitting collapsing closure thereof at said jaw elements by suction applied within said section from said outlet end and the force resulting therefrom as applied through said arm members to the jaw elements.

8. A normally open vacuum collapsible valve for use in the milk flow tube of a milking machine for closing the tube when the flow of milk therethrough substantially ceases, comprising a tube-like member having a flow inlet end and a flow outlet end and an intermediate widened portion, said widened portion being of flexible material adapted for collapsing contraction by vacuum to a milk shut off position and having substantially flat exterior top and bottom surfaces, and rigid plates extending longitudinally along the top and bottom surfaces of the widened portion of said tube-like member, said plates being hinged to each other at their ends nearest said outlet end and having oppositely-facing jaw elements, at their other ends for engagement in a transverse plane with such surfaces, said plates being secured to said top and bottom surfaces respectively along the extent thereof between the hinged and jaw element ends of the plates for being contracted with said surfaces so as to exert a force to collapse the tube at said jaw elements by and upon collapsing movement of said surfaces under the influence of suction applied from said outlet end, said valve comprising resilient biasing means urging the valve toward its normally open position.

(References on following page)

References Cited in the file of this patent

UNITED STATES PATENTS

| | | |
|---|---|---|
| 525,816 | Osborn | Sept. 11, 1894 |
| 844,410 | Schauer | Feb. 19, 1907 |
| 973,704 | Sabroe | Oct. 25, 1910 |
| 1,586,923 | Townsend | June 1, 1926 |
| 1,683,322 | Annis | Sept. 4, 1928 |
| 2,342,192 | Grigsby | Feb. 22, 1944 |
| 2,467,150 | Nordell | Apr. 12, 1949 |
| 2,558,152 | Perkins | June 26, 1951 |
| 2,572,658 | Perkins | Oct. 23, 1951 |

FOREIGN PATENTS

| | | |
|---|---|---|
| 503,291 | Germany | Apr. 12, 1949 |